(12) United States Patent
Jeong

(10) Patent No.: US 7,224,843 B2
(45) Date of Patent: May 29, 2007

(54) APPARATUS FOR BINARY-CODING IMAGE AND METHOD USING THE SAME

(75) Inventor: Young-hoon Jeong, Suwon-si (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 776 days.

(21) Appl. No.: 10/373,836

(22) Filed: Feb. 27, 2003

(65) Prior Publication Data
US 2003/0228062 A1 Dec. 11, 2003

(30) Foreign Application Priority Data
Jun. 5, 2002 (KR) .................. 10-2002-0031607

(51) Int. Cl.
G06K 9/36 (2006.01)
G06K 9/46 (2006.01)
G06K 9/38 (2006.01)

(52) U.S. Cl. ..................... 382/237; 382/272

(58) Field of Classification Search ............ 382/272, 382/237
See application file for complete search history.

(56) References Cited

U.S. PATENT DOCUMENTS

| | | | | |
|---|---|---|---|---|
| 5,245,677 A | * | 9/1993 | Lepore et al. ............ | 382/272 |
| 5,268,773 A | * | 12/1993 | Park et al. .............. | 358/466 |
| 5,491,564 A | * | 2/1996 | Hongu ................. | 382/238 |
| 5,610,999 A | * | 3/1997 | Bannai et al. ............ | 382/272 |
| 5,784,488 A | * | 7/1998 | Kuwata ................ | 382/176 |
| 5,802,209 A | * | 9/1998 | Hattori et al. ............ | 382/232 |
| 5,963,669 A | * | 10/1999 | Wesolkowski et al. ...... | 382/206 |
| 6,134,355 A | * | 10/2000 | Yamada et al. ............ | 382/272 |
| 6,269,191 B1 | * | 7/2001 | Kim .................... | 382/237 |
| 6,351,566 B1 | * | 2/2002 | Zlotnick ................ | 382/237 |
| 6,577,762 B1 | * | 6/2003 | Seeger et al. ............ | 382/173 |

FOREIGN PATENT DOCUMENTS

| | | |
|---|---|---|
| JP | 2-113669 A | 4/1990 |
| JP | 5-62677 B2 | 9/1993 |
| JP | 7-95400 A | 4/1995 |
| JP | 11-261819 | 9/1999 |
| JP | 2002-44444 A | 2/2002 |
| KR | 1999-0052966 | 7/1999 |

* cited by examiner

Primary Examiner—Wenpeng Chen
Assistant Examiner—Yuzhen Ge
(74) Attorney, Agent, or Firm—Sughrue Mion, PLLC

(57) ABSTRACT

Provided are an apparatus and method for binary-coding images considering the brightness of a current pixel and a difference in brightness between pixels. The apparatus includes a detector for detecting a local adaptive critical value for a pixel according to a regional characteristic of the pixel in the image, and a comparator for comparing the local adaptive critical value with the value of the pixel and outputting a binary-coded pixel value corresponding to the pixel. In detecting the local adaptive critical value, a local average parameter $F_{Loc}$ related to high frequency elements is supplied after being controlled according to a locally windowed region. Frequencies for converting from black pixels to white pixels or from white pixels to black pixels are reduced in a binary-coded output image so that an image with a reduced number of high frequency elements can be obtained to improve the compressibility of the binary-coded output image.

21 Claims, 9 Drawing Sheets

FIG. 2A

| 0 | 108 | 32 | 160 |
|---|---|---|---|
| 192 | 64 | 224 | 96 |
| 48 | 172 | 16 | 155 |
| 250 | 112 | 208 | 80 |

FIG. 2B

| 0 | 128 | 32 | 160 | 8 | 126 | 40 | 168 |
|---|---|---|---|---|---|---|---|
| 192 | 64 | 224 | 96 | 200 | 72 | 232 | 104 |
| 48 | 172 | 16 | 144 | 56 | 184 | 15 | 152 |
| 250 | 112 | 208 | 80 | 248 | 120 | 216 | 88 |
| 12 | 140 | 44 | 172 | 4 | 132 | 36 | 164 |
| 204 | 76 | 236 | 108 | 186 | 68 | 228 | 100 |
| 60 | 188 | 28 | 156 | 52 | 180 | 20 | 148 |
| 252 | 124 | 220 | 92 | 244 | 116 | 212 | 84 |

FIG. 2C

| 96 | 112 | 128 | 144 |
|---|---|---|---|
| 80 | 0 | 16 | 160 |
| 64 | 48 | 32 | 176 |
| 240 | 224 | 208 | 192 |

CURRENT PIXEL TO BE PRESENTLY PROCESSED

APPARATUS FOR BINARY-CODING IMAGE AND METHOD USING THE SAME

BACKGROUND OF THE INVENTION

This application claims the priority of Korean Patent Application No. 2002-31607, filed Jun. 5, 2002, which is incorporated herein in its entirety by reference.

1. Field of the Invention

The present invention relates to an apparatus and a method, which can output continuous-tone images as binary-coded data, and more particularly, to an apparatus and method for binary-coding images so as to improve the quality of output images.

2. Description of the Related Art

A continuous-tone image consists of pixel values in a two-dimensional space. A binary coding apparatus limits output values to binary-coded values. For example, the binary-coding apparatus can be used for an apparatus, such as a facsimile, a printer, a digital copy machine, and a liquid crystal display (LCD) panel.

When a continuous-tone image is input to the binary-coding apparatus, the apparatus simplifies continuous-tone values to two levels, i.e., 0 or 1, and outputs the simplified values. To this end, a conventional binary-coding apparatus masks input pixels to critical values of the locations of the pixels that are presently processed.

FIG. 1 is a block diagram illustrating a conventional binary-coding apparatus. Referring to FIG. 1, a conventional binary-coding apparatus includes a counter unit 100, a memory address generator 110, a memory 120, and a comparator 130.

The counter unit 100 outputs location information on an input pixel I(x,y) in a two dimensional image. The counter unit 100 outputs the location information while considering that continuous-tone images are input pixel-by-pixel from the top left corner to the bottom right corner of the two dimensional image. Accordingly, the counter unit 100 includes an X-axis location counter 101 and a Y-axis location counter 102. The X-axis location counter 101 outputs an X-axis value of the input pixel I(x,y) in the two dimensional image. The Y-axis location counter 102 outputs a Y-axis value of the input pixel I(x,y) in the two dimensional image.

The memory address generator 110 generates a one dimensional memory address corresponding to the X-axis and Y-axis location information output from the counter unit 100 and a control signal that controls the read mode of the memory 120.

The memory 120 stores mask critical values corresponding to each pixel of the two dimensional image. When the memory address and the control signal are transferred from the memory address generator 110, the memory outputs a predetermined mask critical value M(x,y) corresponding to the input pixel I(x,y).

The comparator 130 compares the value of the input pixel I(x,y) with the mask critical value M(x,y) to output a binary pixel value B(x,y) of the input pixel I(x,y). For example, if the value of the input pixel I(x,y) is larger than the mask critical value M(x,y), the comparator 130 outputs 1 as the binary pixel value B(x,y). If the value of the input pixel I(x,y) is not larger than the mask critical value M(x,y), the comparator 130 outputs 0 as the binary pixel value B(x,y).

Therefore, the quality of the binary-coded image output from the binary-coding apparatus is determined according to the resolution, the distribution and the size of a mask of the mask critical values stored in the memory 120. In other words, if the elements of the mask critical values are regularly arranged in the memory 120, regular patterns are formed in the image output from the binary-coding apparatus.

Bayer Dither's mask critical value matrices, which have been widely used, are shown in FIGS. 2A through 2C. FIG. 2A illustrates a 4×4 matrix of pixels and FIG. 2B illustrates an 8×8 matrix of pixels. FIG. 2C is the mask critical value matrix for rotate Bayer Dither of the 4×4 of pixels. When the size of a mask critical value matrix, i.e., a mask size, is small, arbitrary patterns may occur in a binary-coded image due to irregularities in the critical values located at visual edges and the edge values of a peripheral critical value arrangement.

A stochastic mask having irregularly arranged critical values, high frequency elements, and a size larger than a conventional mask can be used. Since the stochastic mask can represent a large number of critical values, the tone of an image output from a binary-coding apparatus can be improved.

The above-described masks are iteratively used for a two dimensional image as shown in FIG. 3. Here, FIG. 3 is a conceptual diagram illustrating a method of outputting a binary-coded image using the masking method of FIG. 1, wherein masks having the same size are iteratively used.

However, experimentally, a binary-coded image with reduced regular patterns due to the iterative use of the mask can be outputted only when the mask is larger than 64×64 pixels. As the size of a mask increases, it is possible to reduce the amount of patterning in an output binary-coded image. However, in that case, a memory capacity for storing mask critical values also increases. In addition, since the mask includes a high frequency element, such as blue noise, the high frequency element of an input image signal is reduced by the mask critical values. Therefore, the image quality of boundary elements, which are visually important elements in an image, is lowered as shown in FIG. 4. Here, the mask critical values are dispersed in the blue noise. In other words, the blue noise occurs because the critical values having similar values are separate from each other. A mask in which critical values are dispersed produces an excellent quality image; however, the mask cannot produce boundary portions due to the dispersed critical values. In other words, if the mask is used, the tone of a background having a large number of low frequency elements is represented well; however, the tone of boundary portions of characters or fine images is damaged. In addition, the technology to output the binary-coding image proposed has been previously disclosed in U.S. Pat. No. 5,825,940.

SUMMARY OF THE INVENTION

The present invention provides an apparatus for binary-coding images which considers the brightness of a present pixel and differences in the brightness of peripheral pixels and the brightness of the present pixel, and a method using the method.

The present invention also provides an apparatus and method of binary-coding images for binary-coding a plain region of an input image by a conventional masking method and for binary-coding fine portions of the input image, such as boundary regions, considering local characteristics.

According to an aspect of the present invention, there is provided an apparatus for binary-coding images comprising a detector for detecting a local adaptive critical value for a current pixel according to a regional characteristic of the current pixel in the image, and a comparator for comparing the local adaptive critical value detected in the detector with the value of the current pixel and outputting a binary-coded pixel value corresponding to the current pixel based on the results of the comparison.

It is preferable that the detector detects an image characteristic of a predetermined region on the basis of the current pixel in the image by using the values and average value of pixels included in the predetermined region.

It is preferable that the average value of the pixels, a predetermined mask critical value corresponding to the location of the current pixel, and the offset for the input image are changed by a parameter generated according to the image characteristic of the predetermined region to detect the local adaptive critical value.

It is preferable that the parameter is determined according to the number of high frequency elements to be represented in the predetermined region.

According to the other aspect of the present invention, there is provided an apparatus for binary-coding images so as to output an input image as a binary-coded image, the apparatus comprising a local windowing unit for locally windowing the input image on the basis of a current pixel; a local average detector for detecting an average of the region windowed in the local windowing unit; a mask critical value generator for generating a mask critical value corresponding to the current pixel; an offset generator for generating an offset of the input image; a weighting factor supply unit for supplying weighting factors for each of the local average, the mask critical value, and the offset, by using the values of the pixels included in the locally windowed region and the local average; a detector for detecting a local adaptive critical value for the current pixel by using the local average, the mask critical value, and the offset affected by the weighting factors supplied from the weighting factor supply unit; and a comparator for outputting a binary-coded pixel value corresponding to the current pixel by comparing the local adaptive critical value with the current pixel.

It is preferable that the local average detector uses a directional filter coefficient $a_{ij}$ for each pixel and each pixel value $I(x,y)$ in the following equation to detect a local average of the locally windowed region.

$$Avg_{Loc}(x,y) = \sum_{i=-1}^{+1}\sum_{j=-1}^{0} a_{ij}I(x-i\Delta x, y-j\Delta y) \bigg/ \sum_{i=-1}^{+1}\sum_{j=-1}^{0} a_{ij}$$

It is preferable that the weighting factor supply unit includes a table storing at least one weighting factor for each of the local average, the mask critical value, and the offset; a detector for detecting the characteristic of the image in the locally windowed region and performing an operation on the local average and the values of the pixels included in the locally windowed region; and an address generator for generating an address for the table so that the table outputs the weighting factor according to the characteristic of the image detected by the detector.

It is preferable that the detector detects the characteristic of the image by using the difference between a minimum pixel value and a maximum pixel value in the locally windowed region and the local average. It is preferable that the weighting factor stored in the table is previously established considering the contrast and emphasis on boundaries of the input image.

It is preferable that the detector includes a first multiplier for multiplying the local average by the weighting factor supplied from the weighting factor supply unit; a second multiplier for multiplying the mask critical value generated in the mask critical value generator by the weighting factor supplied from the weighting factor supply unit; a third multiplier for multiplying the offset generated in the offset generator by the weighting factor supplied from the weighting factor supply unit; and an adder for adding signals output from the first through third multipliers and outputting the addition result as the local adaptive critical value.

It is preferable that the detector uses the weighting factors supplied from the weighting factor supply unit, the local average, the mask critical value, and the offset in the following equation to detect the local adaptive critical value.

$$Th_{Loc}(x,y) = Avg_{Loc}(x,y) \times F_{Loc} + M(x,y) \times F_{Mask} + \text{offset} \times F_{offset}$$

Wherein, $Avg_{Loc}(x,y)$ denotes the local average, $F_{Loc}$ denotes the weighting factor for the local average, $M(x,y)$ denotes the mask critical value, $F_{Mask}$ denotes the weighting factor for the mask critical value, offset denotes the offset, and $F_{offset}$ denotes the weighting factor for the offset. In addition, it is preferable that the weighting factor for the local average controls high pass filtering of the input image; the weighting factor for the mask critical value controls the reflective ratio of the mask critical value to the local adaptive critical value; and the offset weighting factor controls the reflective ratio of the offset to the local adaptive critical value.

It is preferable that the local windowing unit performs a windowing operation to include an upper left pixel, an upper pixel, an upper right pixel, and a left pixel on the basis of the current pixel.

According to another aspect of the present invention, there is provided a method of binary-coding images for outputting an input image as a binary-coded image, the method comprising: detecting a local adaptive critical value for a current pixel according to a regional characteristic of the current pixel in the image; and comparing the detected local adaptive critical value with the value of the current pixel so as to output a binary-coded pixel value corresponding to the current pixel.

According to another aspect of the present invention, there is provided a method of binary-coding images for outputting an input image as a binary-coded image, the method comprising: locally windowing the input image on the basis of a current pixel; detecting an average of the region which is locally windowed; generating a mask critical value corresponding to the current pixel and an offset of the input image; supplying weighting factors for each of the local average, the mask critical value, and the offset, by using the values of the pixels included in the locally windowed region and the local average; detecting a local adaptive critical value for the current pixel by using the local average, the mask critical value, and the offset affected by the weighting factors; and comparing the local adaptive critical value with the current pixel to output a binary-coded pixel value corresponding to the current pixel.

BRIEF DESCRIPTION OF THE DRAWINGS

The above objective and advantages of the present invention will become more apparent by describing in detail preferred embodiments thereof with reference to the attached drawings in which:

FIGS. 2A through 2C illustrate examples of a conventional mask;

DETAILED DESCRIPTION OF THE INVENTION

Figure 5:
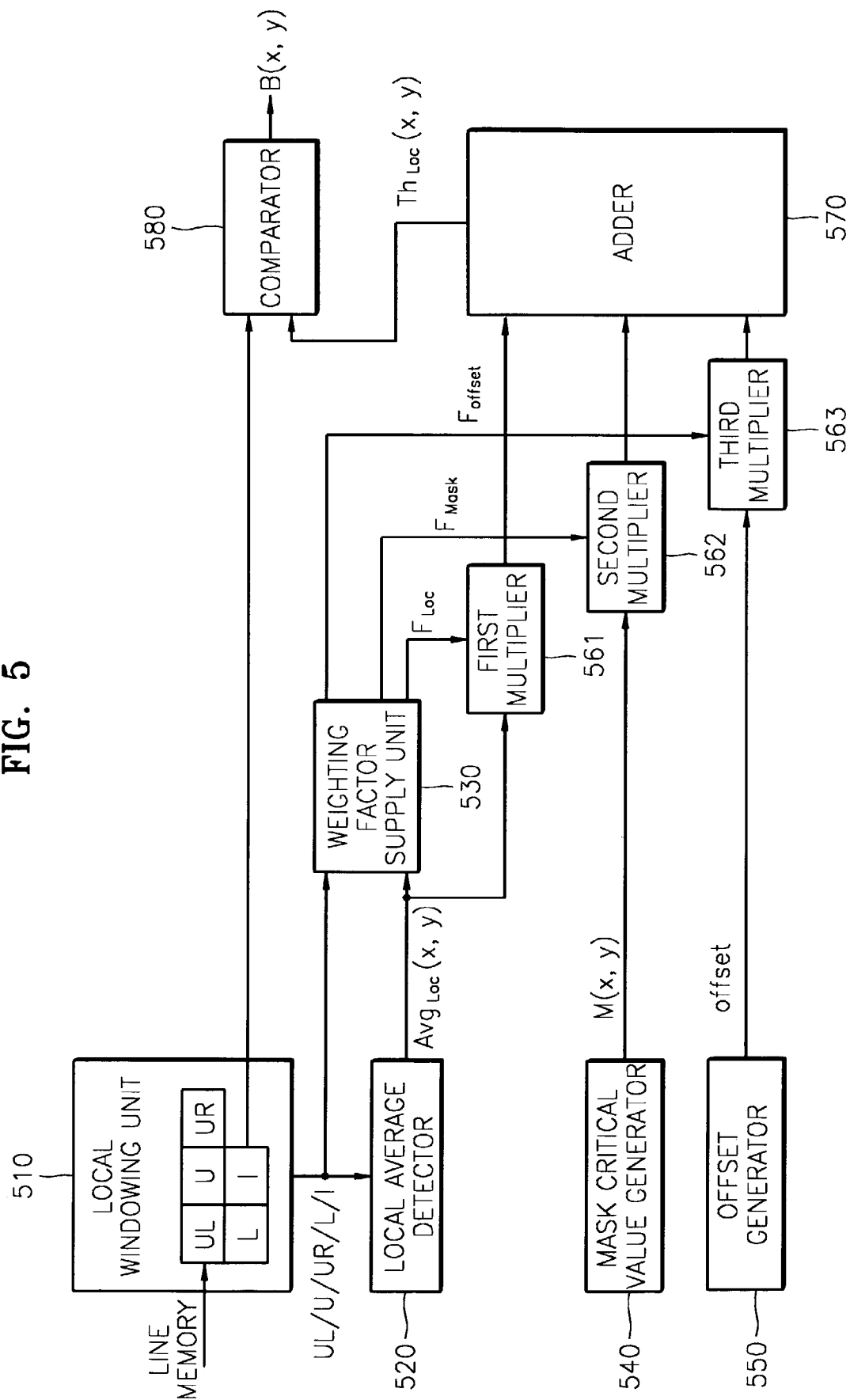
FIG. 5 is a block diagram illustrating an apparatus for binary-coding images according to an embodiment of the present invention.

FIG. 5 is a block diagram illustrating an apparatus for binary-coding images according to an embodiment of the present invention. Referring to FIG. 5, an apparatus according to the present invention includes a local windowing unit 510, a local average detector 520, a weighting factor supply unit 530, a mask critical value generator 540, an offset generator 550, first through third multipliers 561, 562, and 563, an adder 570, and a comparator 580.

Figure 6:
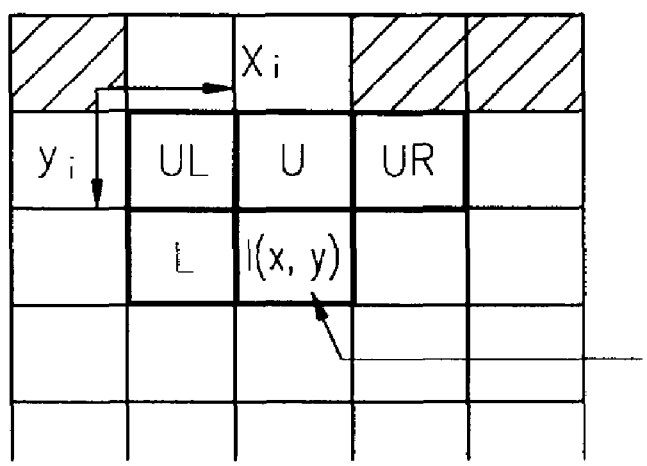
FIG. 6 is an example of an image region windowed in a local windowing unit of FIG. 5.

The local windowing unit 510 supplies a current pixel value I(x,y) and values of the peripheral pixels of the current pixel I(x,y) in a two-dimensional image. Here, the peripheral pixels of the current pixel I(x,y) include an upper left pixel UL, an upper pixel U, an upper right pixel UR, and a left pixel L with reference to the current pixel I(x,y) as shown in FIG. 6. Since the right pixel of the current pixel I(x,y) cannot be stored by a causal system, the right pixel cannot be included in the peripheral pixels. Here, the values of the pixels in the line of pixels above the currenet pixel I(x,y) are stored in a line memory (not shown) when processing a previous line. Accordingly, the values of the pixels in the upper line are provided from the line memory.

The local windowing unit 510, which is formed of a shift register, transfers pixel values to the left every time a binary-coding process for a pixel is completed. In other words, the upper right pixel UR value is transferred to the upper pixel U and the upper pixel U value is transferred to the upper left pixel UL. In addition, the upper left pixel UL value is eliminated. The current pixel I value is transferred to the left pixel L. Here, the upper right pixel UR value is provided from the line memory and the current pixel I value is the pixel value that is presently input.

The values of the current pixel I and the peripheral pixels windowed in the local windowing unit 510 are sent to the local average detector 520 and the weighting factor supply unit 530.

Thereafter, the local average detector 520 detects a local average $Avg_{Loc}(x,y)$ by applying the values of the current pixel I and the peripheral pixels UL, U, UR, and L to Equation 1.

$$Avg_{Loc}(x,y) = \sum_{i=-1}^{+1} \sum_{j=-1}^{0} a_{ij} I(x - i\Delta x, y - j\Delta y) \Big/ \sum_{i=-1}^{+1} \sum_{j=-1}^{0} a_{ij} \quad (1)$$

In Equation 1, $a_{ij}$, which performs as a directional filter coefficient, is a weighting factor for each window pixel. When the directional filter coefficient $a_{ij}$ is [1,1,1,1], the best image characteristic can be obtained. However, since the directional filter coefficient $a_{ij}$ performs as the weighting factor for each window pixel, the directional filter coefficient $a_{ij}$ may have different values for each pixel.

In Equation 1, I(x,y) denotes the values of the pixels UL, U, UR, L, and I at the windowed locations. Here, $x - i\Delta x$ is the location of the pixel on an X-axis and $y - j\Delta y$ is the location of the pixel on a Y-axis. Accordingly, the local average detector 520 multiplies the corresponding weighting factors $a_{ij}$ by values of the pixels UR, U, UR, L, and I transferred from the local windowing unit 510 and adds the multiplied values. Thereafter, the local average detector 520 divides the sum by the sum of the weighting factors, i.e., $$\sum_{i=-1}^{+1} \sum_{j=-1}^{0} a_{ij},$$

to obtain a local average value of an image which is locally windowed at present. Next, the local average value is transferred to the weighting factor supply unit 530 and the first multiplier 561.

The weighting factor supply unit 530 analyzes the characteristic of the locally windowed region by using the values of the pixels UL, U, UR, L, and I transferred from the local windowing unit 510 and the local average value $Avg_{Loc}(x,y)$ transferred from the local average detector 520. In addition, the weighting factor supply unit 530 supplies weighting factors to be used on the local average value $Avg_{Loc}(x,y)$, a mask critical value M(x,y), and an offset value, which will be described later.

Figure 7:
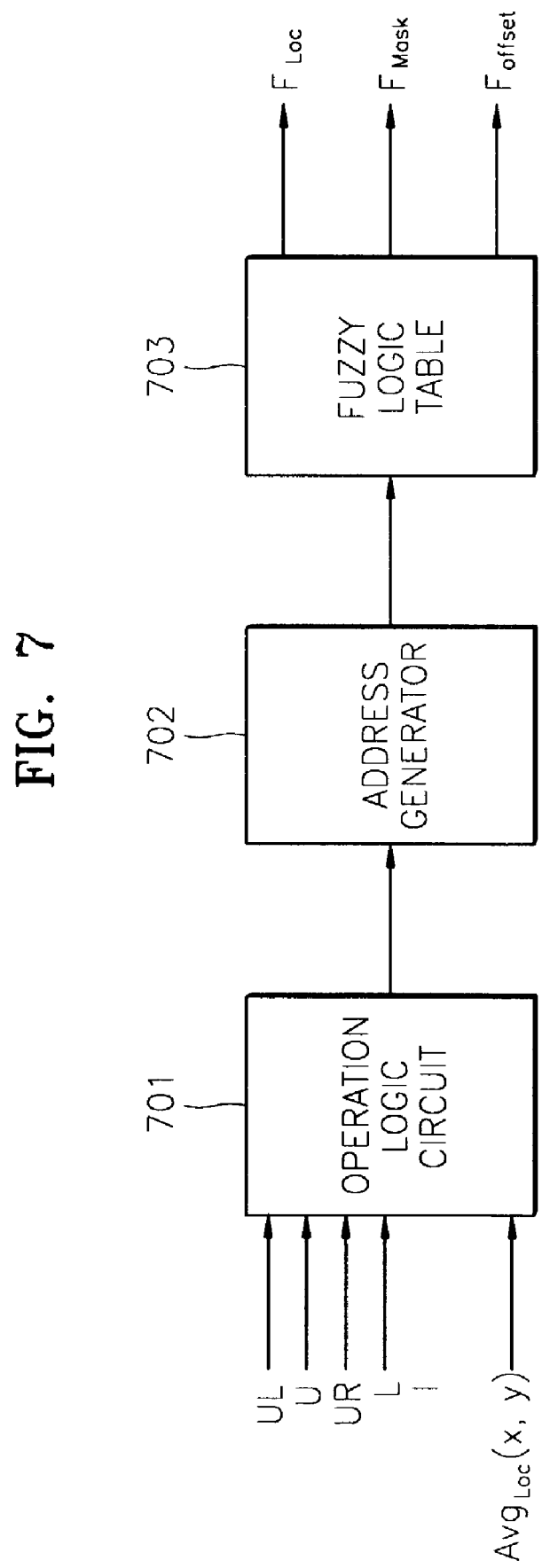
FIG. 7 is a detailed block diagram illustrating a weighting factor supply unit of FIG. 5.

To this end, the weighting factor supply unit 530 includes an operation logic circuit 701, an address generator 702, and a fuzzy logic table 703 as shown in FIG. 7.

The operation logic circuit 701 supplies a value for analyzing the characteristic of the locally windowed region by using the values of the pixels UL, U, UR, L, and I and the local average value $Avg_{Loc}(x,y)$. Here, the operation logic circuit 701 detects the maximum and minimum values among the values of the pixels UL, U, UR, L, and I and detects the difference between the detected maximum and minimum values. Next, the operation logic circuit 701 transfers the detected difference and the local average value $Avg_{Loc}(x,y)$ to the address generator 702.

The address generator 702 generates an address based on the transferred difference and the local average value $Avg_{Loc}(x,y)$ and sends the address to the fuzzy logic table 703.

The fuzzy logic table 703 stores a plurality of local average value parameters $F_{Loc}$, mask critical value parameters $F_{Mask}$, and offset parameters $F_{offset}$ according to the brightness characteristic of the locally windowed region. Here, the brightness characteristic of the locally windowed region is determined based on the brightness of the pixel to be presently processed and the difference between the brightness of the current pixel and the brightness of the peripheral pixels. The parameters stored in the fuzzy logic table 703 may be separated according to the characteristics of the locally windowed region, for example, a bright background region, a dark background region, a background region having a mid-level brightness, a region having fine images, or a boundary region having both background and fine images.

In addition, the region can be defined to determine whether the region is the white background region of characters or images, the background region of characters, an image region, or a character region.

Here, the parameters are weighting factors. In other words, the local average value parameter $F_{Loc}$ is a weighting factor for a local average value, the mask critical value parameter $F_{Mask}$ is a weighting factor for a mask critical value, and the offset parameter $F_{offset}$ is an offset weighting factor.

Therefore, the address generator 702 analyzes the characteristic of the locally windowed region based on the difference and the local average value $Avg_{Loc}(x,y)$ supplied from the operation logic circuit 701 and generates an address in order to output the corresponding parameters $F_{Loc}$, $F_{Mask}$, and $F_{offset}$ from the fuzzy logic table 703.

Figure 1:
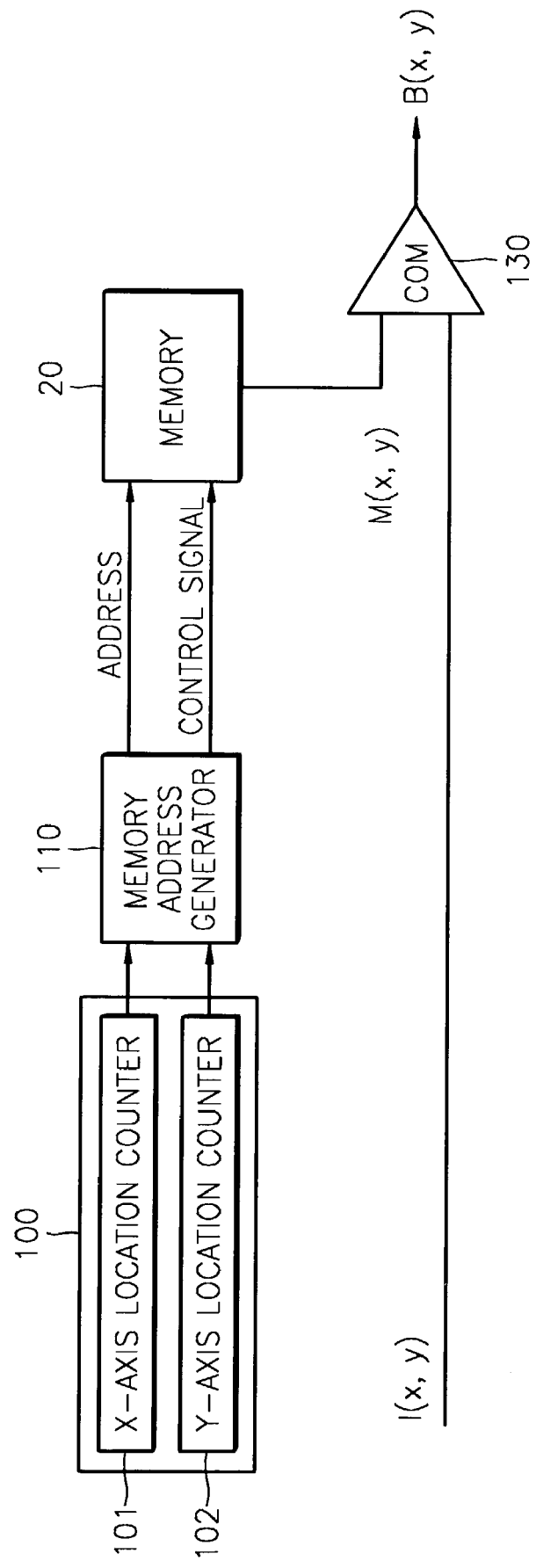
FIG. 1 is a block diagram illustrating a conventional apparatus for binary-coding images.
Figure 3:
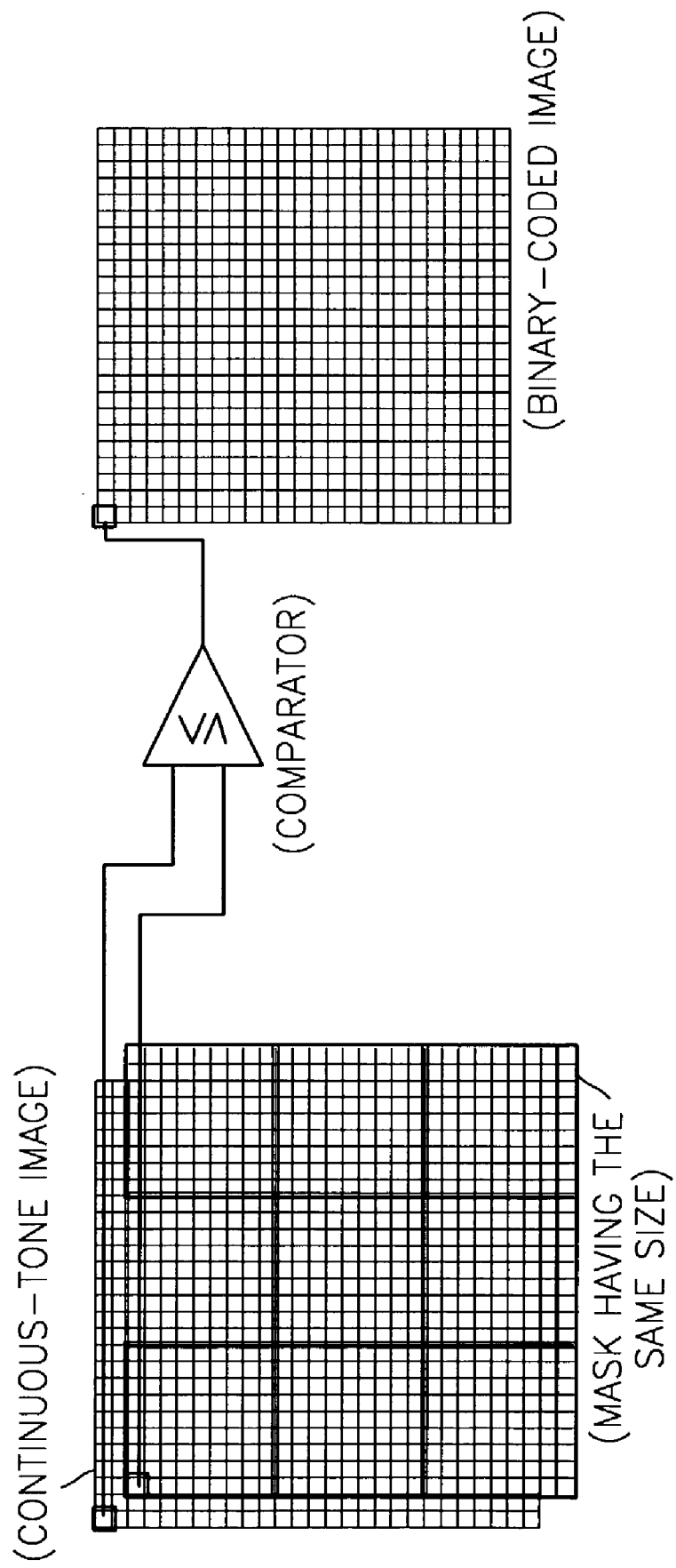
FIG. 3 is a conceptual diagram illustrating a conventional apparatus for binary-coding images, of FIG. 1.

The mask critical value generator 540 generates a mask critical value $M(x,y)$ for the current pixel. To this end, the mask critical value generator 540 includes a counter unit 100, a memory address generator 110, and a memory 120 as shown in FIG. 1. Here, the memory 120 stores a mask critical value for blue noise as the mask critical value $M(x,y)$. Counters 101 and 102 in the counter unit 100 are 7-bit counters that can count locations from 0 to 63. Consequently, the size of the mask is 64×64 pixels. When a signal reporting the completion of processing for one pixel or one line is input from the outside, the counters 101 and 102 increase a count value.

The offset generator 550, which is formed of one register (not shown), generates an offset for a corresponding binary-coding apparatus. The offset generator 550 stores an offset value to be generated in the register and generates a stored offset signal whenever a signal reporting the completion of processing for one pixel is input.

The first multiplier 561 multiplies the local average value $Avg_{Loc}(x,y)$ output from the local average detector 520 by the weighting factor $F_{Loc}$ supplied from the weighting factor supply unit 530. The second multiplier 562 multiplies the mask critical value $M(x,y)$ by the weighting factor $F_{Mask}$ supplied from the weighting factor supply unit 530. The third multiplier 563 multiplies the offset value by the weighting factor $F_{offset}$ supplied from the weighting factor supply unit 530.

The adder 570 adds the values output from the first through third multipliers 561, 562, and 563 using Equation 2.

$$Th_{Loc}(x,y) = Avg_{Loc}(x,y) \times F_{Loc} + M(x,y) \times F_{Mask} + \text{offset} \times F_{offset} \quad (2)$$

The first term $Avg_{Loc}(x, y) \times F_{Loc}$ of Equation 2 representing the effect of the local average value $Avg_{Loc}(x,y)$ on the local critical value, performs high pass filtering on an input image. Accordingly, if the weighting factor $F_{Loc}$ supplied from the weighting factor supply unit 530 is 1, a large number of high frequency elements, which are included in the input image, can be included in an output binary-coded image. However, if the weighting factor $F_{Loc}$ is 0.7, the offset of the local critical value is 0.7 times larger than the offset of the local average value $Avg_{Loc}(x,y)$, so that the output binary-coded image cannot represent the large number of high frequency elements, which were included in the input image. Therefore, the size of a high pass filter for an input continuous-tone image is controlled by the size of the weighting factor $F_{Loc}$. Consequently, in order to represent a large number of high frequency elements in a locally windowed region, the parameter $F_{Low}$ output from the fuzzy logic table 703 of the weighting factor supply unit 530 has to be a value approaching 1.

The second term $M(x, y) \times F_{Mask}$ of Equation 2 represents the reflective ratio of the mask critical value element to a local adaptive critical value. Accordingly, the weighting factor value $F_{Mask}$ is a reflective ratio of blue noise elements to the local adaptive critical value with reference to the offset. If the weighting factor value $F_{Mask}$ increases, the local adaptive critical value includes the blue noise elements so that an input continuous-tone is represented well.

The third term $\text{offset} \times F_{offset}$ of Equation 2 represents an overall offset of the local adaptive critical value. Here, the offset can be fixed to half of the maximum level of the input continuous-tone image.

The value $Th_{Loc}(x,y)$ output from the adder 570 is the local adaptive critical value of the region which is windowed in the local windowing unit 510. Accordingly, the adder 570 performs as a detector which detects a local adaptive critical value of a pixel to be processed by using the local average, mask critical value, and offset, which are affected by the weighting factor.

The comparator 580 compares the brightness value of the current pixel $I(x,y)$ with the local adaptive critical value output from the adder 570. When the current pixel $I(x,y)$ is larger than the local critical value, the value 1, which corresponds to 255, is output, whereas when the pixel $I(x,y)$ is not larger than the local critical value, the value 0 is output. The values output from the comparator 580 as a result of the comparison can be changed by varying the design of a system. The value output from the comparator 580 is a binary-coded pixel value $B(x,y)$ of the current pixel $I(x,y)$.

Figure 4:
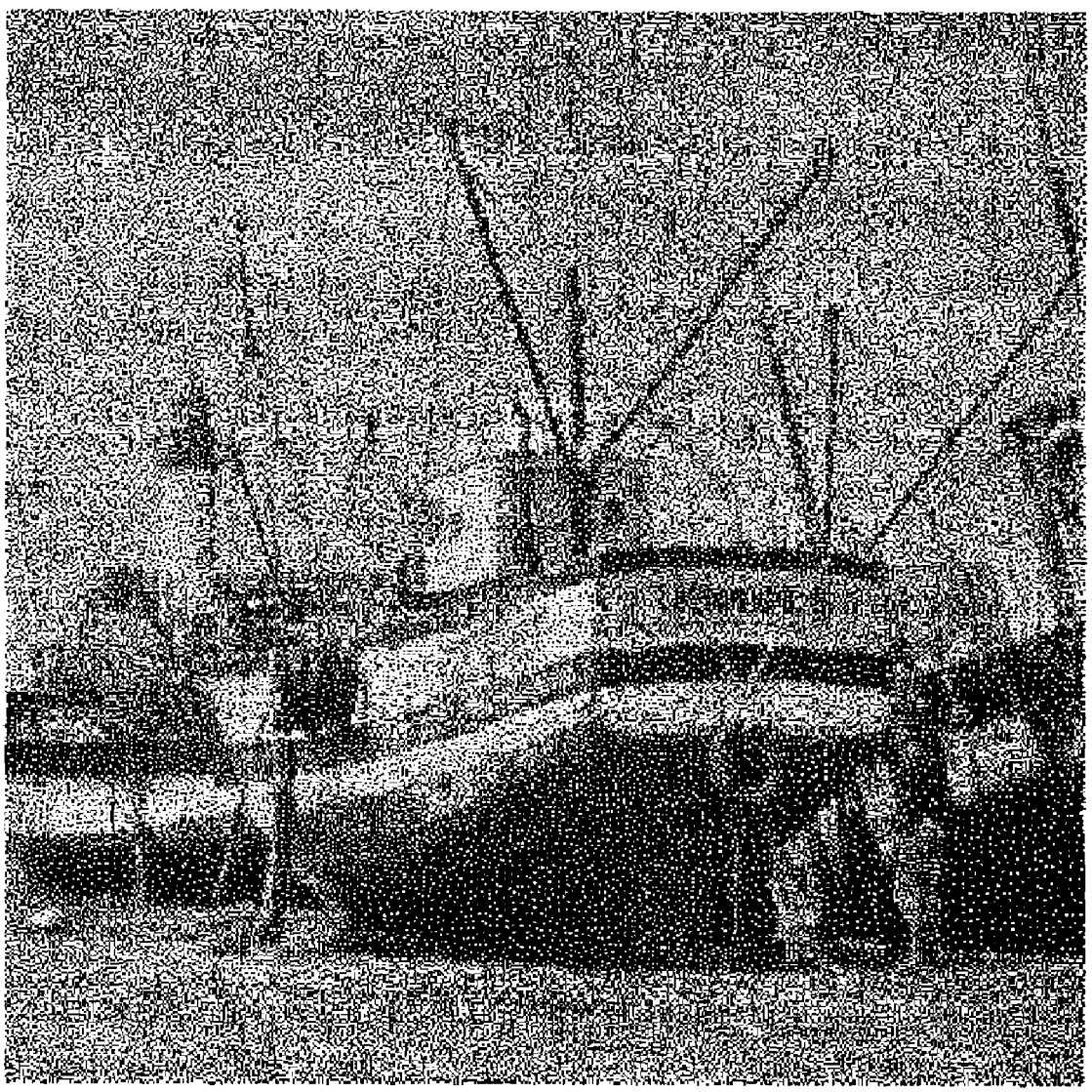
FIG. 4 is an image attained by using a conventional apparatus for binary-coding images.
Figure 8:
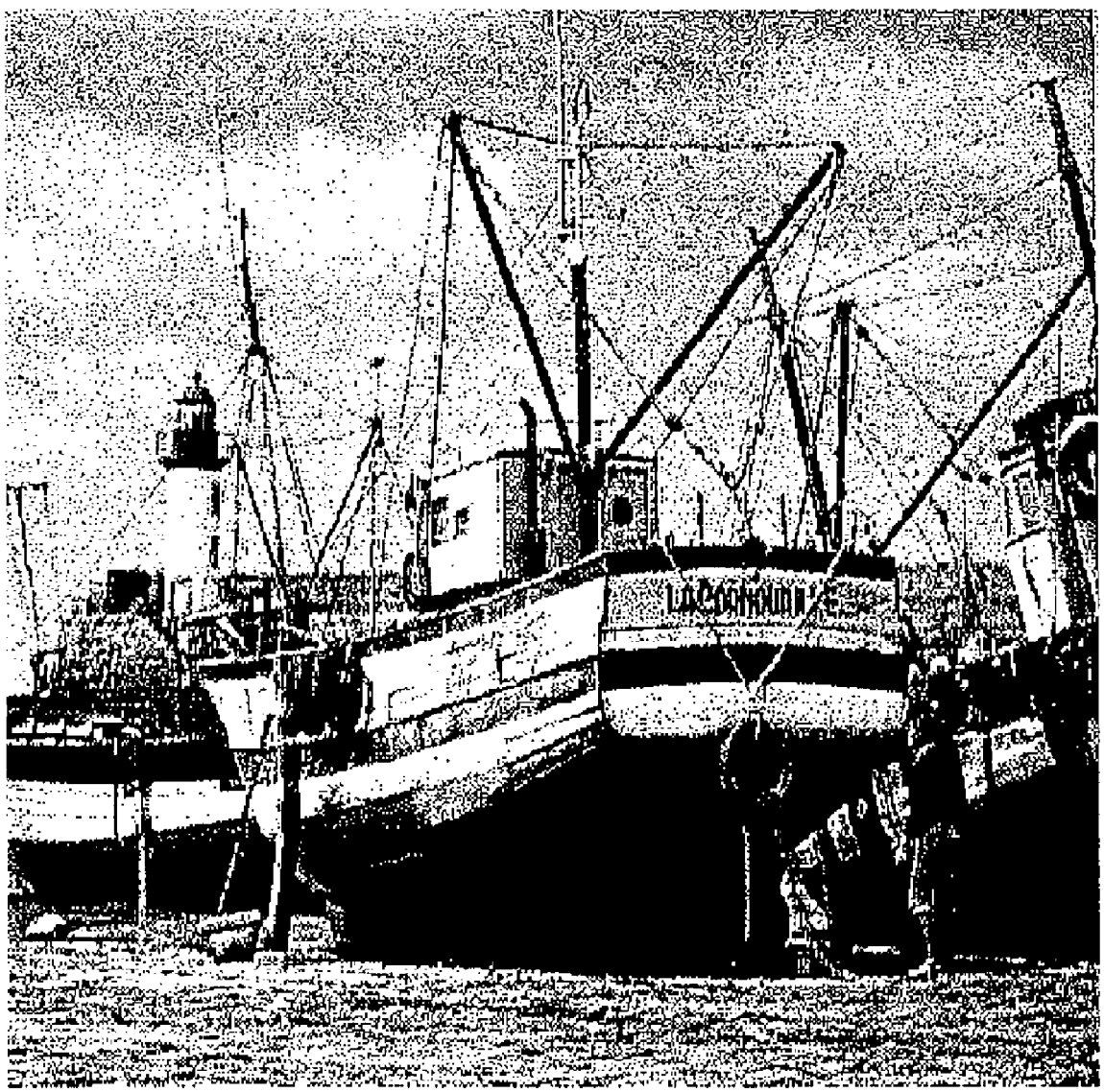
FIG. 8 is an image attained by using the apparatus for binary-coding images, of FIG. 5.

Therefore, while the image of FIG. 4 is obtained by a conventional method, an image with improved boundary quality as shown in FIG. 8 can be obtained according to the present invention.

The above-described local average detector 520, weighting factor supply unit 530, mask critical value generator 540, offset generator 550, first through third multipliers 561, 562, and 563, and adder 570 can be referred to as detection units for detecting the local adaptive critical values of a current pixel.

Figure 9:
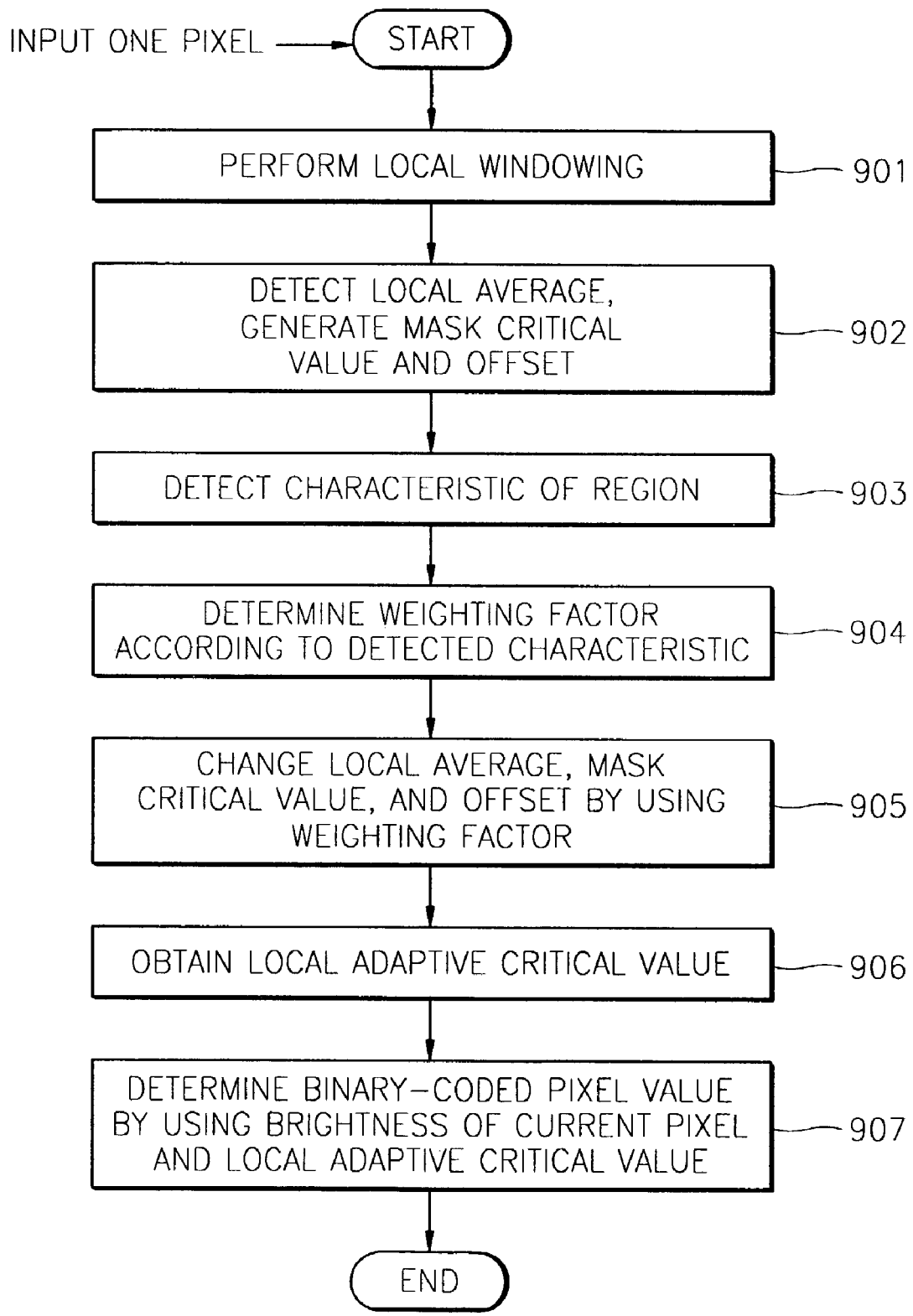
FIG. 9 is a flowchart illustrating a method of binary-coding images according to the preferred embodiment of the present invention.

A binary-coding method according to the present invention will now be described with reference to FIG. 9.

In step 901, when a current pixel $I(x,y)$ to be processed is input, a local windowing process is performed on the current pixel and the peripheral pixels, as described with reference to a local windowing unit 510 of FIG. 5.

A local average $Avg_{Loc}(x,y)$ for the locally windowed pixels is detected and a mask critical value $M(x,y)$ and an offset of the current pixel are generated in step 902. Here, the local average $Avg_{Loc}(x,y)$ is detected using Equation 1. The mask critical value $M(x,y)$ is generated by the same method as described with reference to the mask critical value generator 540. The offset is generated by the same method as described with reference to the offset generator 550.

The characteristic of the locally windowed region in a two-dimensional image is detected by using the local average $Avg_{Loc}(x,y)$ and the locally windowed pixel values in step 903. In other words, it is determined whether the locally windowed region is a plain background region or a boundary region having fine images. Here, the characteristic of the locally windowed region is determined by the same method as described with reference to the fuzzy logic table 703 of the weighting factor supply unit 530.

A weighting factor for varying the characteristics of the local average, the mask- critical value, and the offset is determined according to the characteristic of the detected region in step 904. Here, the weighting factors are parameters supplied from the fuzzy logic table 703.

Thereafter, in step 905, the current local average, mask critical value, and offset are changed by using the parameters. In other words, the local average, the mask critical value, and the offset are changed as described with reference to the first through third multipliers 561, 562, and 563.

In step 906, the local average, mask critical value, and offset, which are multiplied by the weighting factor, are used in Equation 2 to obtain a local adaptive critical value for the current pixel.

In step 907, the brightness value of the current pixel and the local adaptive critical value are compared to determine a binary-coded pixel value corresponding to the current pixel. Here, the comparison is performed as described with reference to the comparator 580 of FIG. 5.

According to the present invention for outputting an input continuous-tone image as a binary-coded image, a local adaptive critical value of a current pixel is determined considering the brightness of the current pixel and the difference between the brightness of the current pixel and the brightness of the peripheral pixels. Thereafter, the local adaptive critical value is compared with the current pixel. Therefore, the present invention uses a smaller number of masks than the number of masks for obtaining a critical value in a conventional binary-coding apparatus so that the generation of regular patterns in an output image is minimized and the quality of images including high frequency elements is improved. In addition, the present invention reduces a memory capacity for storing the mask critical value.

By controlling fuzzy logic table values, various image processing operations such as controlling overall brightness, enhancing contrast, and emphasizing boundaries for the output binary-coded image can be easily changed.

In detecting the local adaptive critical value, a local average parameter $F_{Loc}$ related to high frequency elements is supplied after being controlled according to a locally windowed region. Therefore, frequencies for converting from black pixels to white pixels or from white pixels to black pixels are reduced in a binary-coded output image so that an image with a reduced number of high frequency elements can be obtained. Accordingly, the compressibility of the binary-coded output image can be improved.

It is noted that the present invention is not limited to the preferred embodiment described above, and it is apparent that variations and modifications by those skilled in the art can be effected within the spirit and scope of the present invention defined in the appended claims.

What is claimed is:

1. An apparatus for binary-coding an input image to output a binary-coded image, the apparatus comprising:
   a local windowing unit for locally windowing a region of the input image on a basis of a current pixel thereby forming a locally windowed region;
   a local average detector for detecting a local average of the pixel values in the locally windowed region;
   a mask critical value generator for generating a mask critical value corresponding to the current pixel;
   an offset generator for generating an offset of the input image;
   a weighting factor supply unit for supplying a local average weighting factor, a mask critical value weighting factor, and an offset weighting factor, by using the pixel values of pixels in the locally windowed region and the local average;
   a detector for detecting a local adaptive critical value for the current pixel by using the local average, the mask critical value, and the offset, wherein the local average, the mask critical value, and the offset are affected by respective weighting factors; and
   a comparator for outputting a binary-coded pixel value corresponding to the current pixel by comparing the local adaptive critical value with a current pixel value.

2. The apparatus for binary-coding an input image of claim 1, wherein the local average detector detects the local average by performing an operation on directional filter coefficients of each pixel and the pixel values of each pixel in the locally windowed region.

3. The apparatus for binary-coding an input image of claim 1, wherein the local average detector uses a directional filter coefficient $a_{ij}$ for each pixel and each pixel value I(x,y) of pixels in the locally windowed region in a following equation to detect the local average:

$$Avg_{Loc}(x, y) = \sum_{i=-1}^{+1} \sum_{j=-1}^{0} a_{ij} I(x - i\Delta x, y - j\Delta y) \bigg/ \sum_{i=-1}^{+1} \sum_{j=-1}^{0} a_{ij},$$

wherein $Avg_{Loc}(x,y)$ denotes the local average, $x-i\Delta x$ is the location of a pixel on an X-axis, and $y-j\Delta y$ is the location of a pixel on a Y-axis.

4. The apparatus for binary-coding an input image of claim 1, wherein the weighting factor supply unit includes:
   a table storing at least the local average weighting factor, the mask critical value weighting factor, and the offset weighting factor;
   a detector for detecting a characteristic of an image in the locally windowed region and performing an operation on the local average and the pixel values in the locally windowed region; and
   an address generator for generating an address for the table so that the table outputs the local average weighting factor, the mask critical value weighting factor, and the offset weighting factor, according to the characteristic of the image detected by the detector.

5. The apparatus for binary-coding an input image of claim 4, wherein the detector detects the characteristic of the image by using a difference between a minimum pixel value and a maximum pixel value in the locally windowed region, and the local average.

6. The apparatus for binary-coding an input image of claim 4, wherein at least the local average weighting factor, the mask critical value weighting factor, and the offset weighting factor stored in the table are previously established considering the contrast and emphasis on boundaries of the input image.

7. The apparatus for binary-coding an input image of claim 4, wherein the table stores a plurality of local average weighting factors, a plurality of mask critical value weighting factor, and a plurality of offset weighting factors.

8. The apparatus for binary-coding an input image of claim 1, wherein the detector includes:
   a first multiplier for multiplying the local average by the local average weighting factor supplied from the weighting factor supply unit to produce a first result;
   a second multiplier for multiplying the mask critical value generated in the mask critical value generator by the mask critical value weighting factor supplied from the weighting factor supply unit to produce a second result;
   a third multiplier for multiplying the offset generated in the offset generator by the offset weighting factor supplied from the weighting factor supply unit to produce a third result; and
   an adder for adding the first through third results to produce an addition result, and outputting the addition result as the local adaptive critical value.

9. The apparatus for binary-coding an input image of claim 1, wherein the detector uses the local average weighting factor, the mask critical value weighting factor, and the offset weighting factor supplied from the weighting factor supply unit, the local average, the mask critical value, and the offset in a following equation to detect the local adaptive critical value:

$$Th_{Loc}(x,y) = Avg_{Loc}(x,y) \times F_{Loc} + M(x,y) \times F_{Mask} + \text{offset} \times F_{offset},$$

wherein $Avg_{Loc}(x,y)$ denotes the local average, $F_{Loc}$ denotes the local average weighting factor, $M(x,y)$ denotes the mask critical value, $F_{Mask}$ denotes the mask critical value weighting factor, offset denotes the offset, and $F_{offset}$ denotes the offset weighting factor.

10. The apparatus for binary-coding an input image of claim 9, wherein the local average weighting factor controls high pass filtering of the input image;
   the mask critical value weighting factor controls a first reflective ratio of the mask critical value to the local adaptive critical value; and
   the offset weighting factor controls a second reflective ratio of the offset to the local adaptive critical value.

11. The apparatus for binary-coding an input image of claim 1, wherein the local windowing unit performs a windowing operation to include an upper left pixel, an upper pixel, an upper right pixel, and a left pixel on the basis of the current pixel.

12. The apparatus for binary-coding an input image of claim 1, wherein the local average of the pixel values is a local average of the continuous tone pixel values.

13. The apparatus for binary-coding an input image of claim 1, wherein the weighting factor supply unit supplies the local average weighting factor from a plurality of local average weighting factors, the mask critical value weighting factor from a plurality of mask critical value weighting factors, and the offset weighting factor from a plurality of offset weighting factors.

14. An apparatus for binary-coding an input image to output a binary-coded image, the apparatus comprising:
   a detector for detecting a local adaptive critical value for a current pixel according to a regional characteristic of the current pixel in the input image; and
   a comparator for comparing the local adaptive critical value detected in the detector with a current pixel value and outputting a binary-coded pixel value corresponding to the current pixel based on a result of the comparison,
   wherein the detector detects an image characteristic of a predetermined region on a basis of the current pixel in the continuous tone input image by using continuous tone pixel values in the predetermined region and an average continuous tone pixel value of pixels in the predetermined region to detect the local adaptive critical value and
   the average pixel value, a predetermined mask critical value corresponding to a location of the current pixel, and an offset for the input image are changed by a parameter generated according to the image characteristic of the predetermined region to detect the local adaptive critical value.

15. The apparatus for binary-coding an input image of claim 14, wherein the parameter is determined according to a number of high frequency elements to be represented in the predetermined region.

16. A method of binary-coding an input image to output a binary-coded image, the method comprising:
   detecting a local adaptive critical value for a current pixel according to a regional characteristic of the current pixel in the input image; and
   comparing the detected local adaptive critical value with the current pixel value so as to output a binary-coded pixel value corresponding to the current pixel,
   wherein the input image is a continuous tone input image,
   the detecting the local adaptive critical value includes detecting an image characteristic of a predetermined region on a basis of the current pixel in the continuous tone input image by using continuous tone pixel values in the predetermined region and an average continuous tone pixel value of pixels in the predetermined region to detect the local adaptive critical value and
   detecting the local adaptive critical value includes changing the average continuous tone pixel value in the predetermined region on the basis of the current pixel, changing a predetermined mask critical value corresponding to a location of the current pixel, and changing an offset for the input image by using a parameter generated according to an image characteristic of the predetermined region in the input image so as to detect the local adaptive critical value.

17. The method of binary-coding an input image of claim 16, wherein the parameter is determined according to a number of high frequency elements to be represented in the predetermined region.

18. A method of binary-coding an input image to output a binary-coded image, the method comprising:
   locally windowing the input image on the basis of a current pixel to produce a locally windowed region;
   detecting an average of a region which is locally windowed to produce a local average;
   generating a mask critical value corresponding to the current pixel and an offset of the input image;
   supplying a local average weighting factor, a mask critical value weighting factor, and an offset weighting factor, by using pixel values in the locally windowed region and the local average;
   detecting a local adaptive critical value for the current pixel by using the local average, the mask critical value, and the offset, wherein the local average, the mask critical value, and the offset are affected by respective weighting factors; and
   comparing the local adaptive critical value with the current pixel value to output a binary-coded pixel value corresponding to the current pixel.

19. The method of binary-coding an input image of claim 18, wherein detecting the local average is performed using a directional filter coefficient $a_{ij}$ for each pixel and each pixel value in the following equation:

$$Avg_{Loc}(x, y) = \sum_{i=-1}^{+1} \sum_{j=-1}^{0} a_{ij} I(x - i\Delta x, y - j\Delta y) \Big/ \sum_{i=-1}^{+1} \sum_{j=-1}^{0} a_{ij},$$

wherein $Avg_{Loc}(x,y)$ denotes the local average, $x-i\Delta x$ is the location of a pixel on an X-axis, and $y-j\Delta y$ is the location of a pixel on a Y-axis.

20. The method of binary-coding an input image of claim 18, wherein detecting the local adaptive critical value is performed using the local average weighting factor, the mask critical value weighting factor, the offset weighting factor, the local average, the mask critical value, and the offset in the following equation:

$$Th_{Loc}(x,y) = Avg_{Loc}(x,y) \times F_{Loc} + M(x,y) \times F_{Mask} + \text{offset} \times F_{offset},$$

wherein $Avg_{Loc}(x,y)$ denotes the local average, $F_{Loc}$ denotes the local average weighting factor, $M(x,y)$ denotes the mask critical value, $F_{Mask}$ denotes the mask critical value weighting factor, offset denotes the offset, and $F_{offset}$ denotes the offset weighting factor.

21. The method of binary-coding an input image of claim 18, wherein the supplying the local average weighting factor, the mask critical value weighting factor, and the offset weighting factor, supplies the local average weighting factor from a plurality of local average weighting factors, the mask critical value weighting factor from a plurality of mask critical value weighting factors, and the offset weighting factor from a plurality of offset weighting factors.

* * * * *